(12) United States Patent
Janisch

(10) Patent No.: US 7,715,622 B2
(45) Date of Patent: May 11, 2010

(54) METHOD FOR ANALYZING AN IMAGE

(75) Inventor: Daryl Edward Janisch, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1010 days.

(21) Appl. No.: 11/422,189

(22) Filed: Jun. 5, 2006

(65) Prior Publication Data

US 2007/0280532 A1 Dec. 6, 2007

(51) Int. Cl.
*G06K 9/00* (2006.01)
(52) U.S. Cl. ....................... 382/168; 382/305
(58) Field of Classification Search ............. None
See application file for complete search history.

(56) References Cited

U.S. PATENT DOCUMENTS

| | | | | |
|---|---|---|---|---|
| 6,798,918 | B2* | 9/2004 | Chu et al. | 382/268 |
| 7,379,627 | B2* | 5/2008 | Li et al. | 382/305 |
| 2006/0020597 | A1* | 1/2006 | Keating et al. | 707/6 |

OTHER PUBLICATIONS

Greg Pass & Ramin Zabih (Comparing images using joint histograms) 1999, Springer-Verlag New York, Inc. vol. 7 pp. 234-240.*

Jing Huang, Ramin Zabih, Combining Color and Spatial Information for Content-based Image Retrieval, Computer Science Department, Cornell University, Ithaca, NY.

Greg Pass, Ramin Zabih, Comparing Images Using Joint Histograms, Computer Science Department, Cornell University, Ithaca, NY.

* cited by examiner

*Primary Examiner*—Wesley Tucker
*Assistant Examiner*—Avinash Yentrapati

(57) ABSTRACT

A method for analyzing an image formed of a plurality of pixels, each pixel of the plurality of pixels including a plurality of color channels, each color channel of the plurality of color channel having a channel level within a range of channel levels corresponding to each pixel, including designating from the plurality of color channels a primary channel, a secondary channel, and a tertiary channel; generating histogram data from the image using the plurality of pixels to form a histogram having a first axis and a second axis based on the primary channel, the first axis pertaining to the range of channel levels within the primary channel, and the second axis pertaining to a number of pixels of the image at each the channel level within the primary channel; and reorganizing the histogram based on the secondary channel and the tertiary channel to form a multi-dimensional histogram.

17 Claims, 8 Drawing Sheets

METHOD FOR ANALYZING AN IMAGE

FIELD OF THE INVENTION

The present invention relates to imaging, and, more particularly, to a method for analyzing an image.

BACKGROUND OF THE INVENTION

The proliferation of digital cameras, image scanning equipment, and graphics software has enabled business and home consumers to be able to perform imaging jobs for various purposes more readily than in the past. For example, home users are able to use such equipment and software to obtain digital images that may be used for everyday purposes, such as school projects for both children and adults, the creation of greeting cards, family photo albums, etc. In addition, both small and large business users are able to employ such equipment to obtain image for use in advertising brochures, internal and external presentations and other documents, etc.

Various software products allow the manipulation of such digital images in order to achieve the desired and result, an image which may be printed using readily available imaging apparatus, such as inkjet printers, electrophotographic printers, and all-in-one units that are capable of performing multiple types of imaging jobs, such as printing, copying, scanning, and faxing. Such software products may be stand alone products created by various software manufacturers, or may be part of software bundle packaged with the imaging apparatus.

Once the images are created or otherwise obtained, they are often stored, for example, in a digital image library. In order to search for a particular image in a digital image library, the user may simple look through all unit the desired image is found, which is a cumbersome process. Where the image library has been organized into various categories and subsets of categories, it may be somewhat easier for the user to find the particular image, although the search may still be cumbersome, especially if the image library is a large one.

In order to aid a user in finding a particular image, various software products include a search feature that searches for particular image characteristics based on a conventional histogram. Images are made up of pixels of information. Each pixel in a color image includes at least 3 channels, for example, red, green, and blue. For each pixel there is a relating quantity of these 3 color channels with a black pixel being [0,0,0] and white being [255,255,255]. Some of the pixel information from the image is used to create the conventional histograms used by the image search engine.

A conventional histogram is the graphical representation of an image wherein the quantities of each channel are mapped out. These different channels are mapped individually. A conventional histogram is a graph where the x-axis represents the particular channel levels with the leftmost and having a value of 0 and the rightmost end having a value of 255. For each channel value the quantity of pixel with that value is graphed on the histogram. Each channel is graphed separately.

However, such conventional histograms are limited in the amount of data that may be used to differentiate between different images. For example, depending on the nature of the images, two disparate images may have the same histogram, such as where the quantity of image pixels having various colors is the same as between the two images, although in the one of the image, the distribution of pixels across the image "canvas" is entirely different than the distribution of pixels in the other image. Hence, the search engine's analyzing of the two different images would yield the false result that the images are similar or the same.

What is needed in the art is an improved method for analyzing an image.

SUMMARY OF THE INVENTION

The present invention provides a method for analyzing an image.

The invention, in one form thereof, relates to a method for analyzing an image. The image is formed of a plurality of pixels, wherein each pixel of the plurality of pixels includes a plurality of color channel, each color channel of the plurality of color channel having a channel level within a range of channel levels corresponding to each pixel. The method includes designating from the plurality of color channels a primary channel, a secondary channel, and a tertiary channel; generating histogram data from the image using the plurality of pixels to form a histogram having a first axis and a second axis based on the primary channel, the first axis pertaining to the range of channel levels within the primary channel, and the second axis pertaining to a number of pixels of the image at each the channel level within the primary channel; and reorganizing the histogram based on the secondary channel and the tertiary channel to form a multi-dimensional histogram.

The present invention, in another form thereof, relates to a method for analyzing an image. The image is formed of a plurality of pixels, wherein each pixel of the plurality of pixels includes a plurality of color channels, each color channel of the plurality of color channels having a channel level within a range of channel levels corresponding to each pixel. The method includes designating from the plurality of color channels a primary channel, a secondary channel, and a tertiary channel; generating a histogram having a first axis and a second axis using the plurality of pixels by arranging each pixel along the first axis and the second axis based on the primary channel, the first axis pertaining to the range of channel levels within the primary channel, and the second axis pertaining to a number of pixels of the image at each the channel level within the primary channel, each pixel in the histogram having a position along the first axis; and reorganizing the pixel based on the secondary channel and the tertiary channel to form a multi-dimensional histogram.

The present invention, in yet another form thereof, relates to a computer readable medium storing computer executable instructions for analyzing an image, the image being formed of a plurality of pixels, wherein each pixel of the plurality of pixels includes a plurality of color channels, each color channel of the plurality of color channels having a channel level within a range of channel levels corresponding to each pixel. The computer executable instructions for analyzing the image include designating from the plurality of color channels a primary channel, a secondary channel, and a tertiary channel; generating histogram data form he image using the plurality of pixels to form a histogram having a first axis and a second axis based on the primary channel, the first axis pertaining to the range of channel levels within the primary channel, and the second axis pertaining to a number of pixels of the image at each the channel level within the primary channel; and reorganizing the histogram based on the secondary channel and the tertiary channel to form a multi-dimensional histogram.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiment of the invention, and such exemplifications are not be construed as limiting the scope of the invention in any manner.

DESCRIPTION OF THE PREFERRED EMBODIMENT

Figure 1:
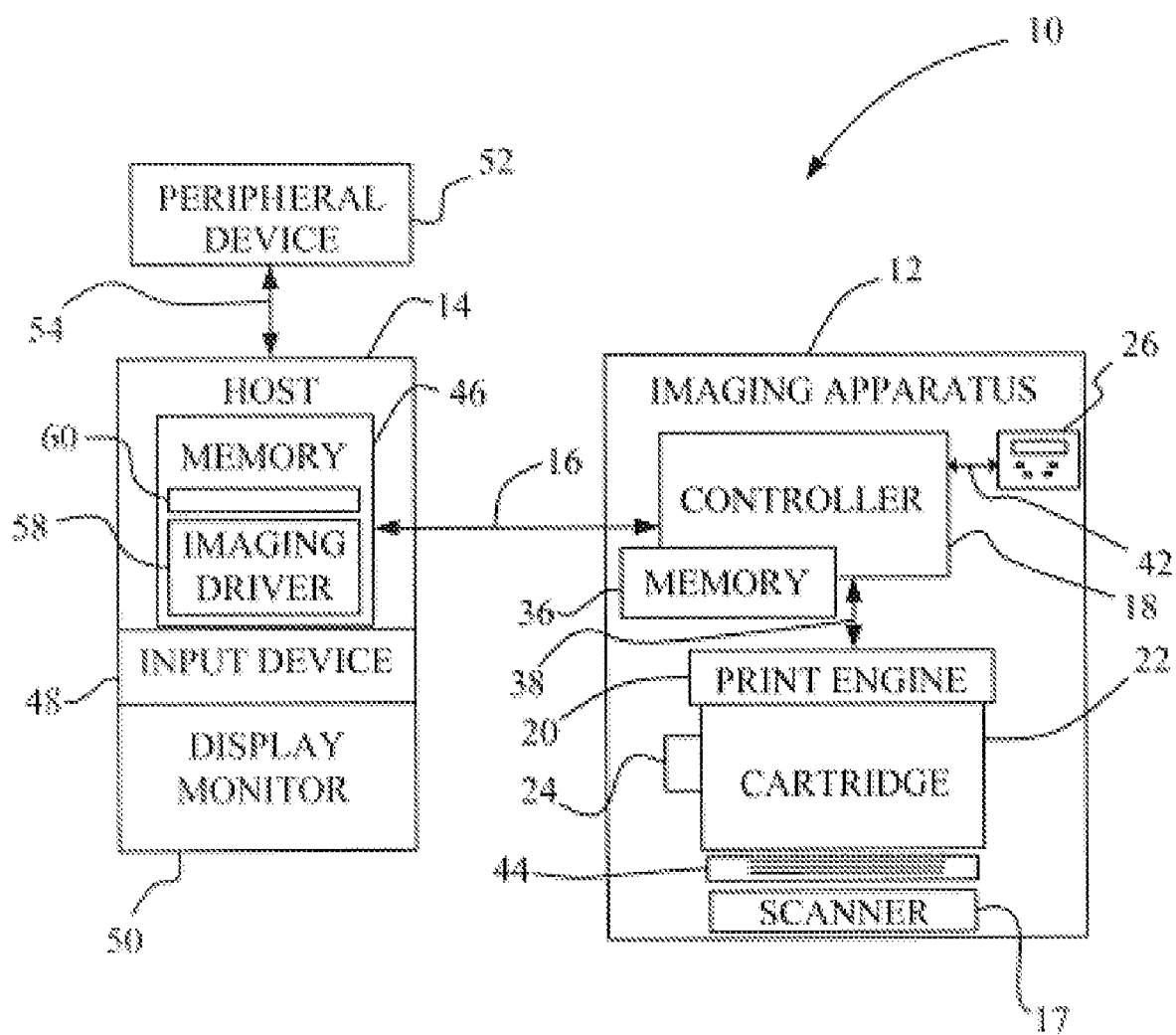
FIG. 1 depicts an imaging system that may be used an accordance with the present invention.

Referring now to the drawings, and particularly to FIG. 1, there is shown a diagrammatic depiction of an imaging system 10 in accordance with an embodiment of the present invention. Imaging system 10 includes an imaging apparatus 12 and a host 14. Imaging apparatus 12 communicates with host 14 via a communications link 16.

Imaging apparatus 12 is in imaging device that produces a printed or scanned output of a patent or latent image. As used herein, an image is a rendering such as may be obtained via a digital camera or scanner, or which may be created or manipulated on a computer, such as host 14, and which may be printed or displayed for viewing by the human eye. Imaging apparatus 12, may be, for example, an ink jet printer and/or copier, an electrophotographic (EP) printer and/or copier, or an all-in-one (AIO) unit that includes a printer, a scanner 17, and possible a fax unit. Imaging apparatus 12 includes a controller 18, a print engine 20, a replaceable cartridge 22 having cartridge memory 24, and a user interface 26.

Controller 18 is communicatively coupled to print engine 20, and print engine 20 is configured to mount cartridge 22. Controller 18 includes a processor unit and associated memory 36, and may be formed as one or more Application Specific Integrated Circuits (ASIC). Controller 18 may be a printer controller, a scanner controller, or may be a combined printer and scanner controller, for example, such as for use in a copier. Although controller 18 is depicted as residing in imaging apparatus 12, alternative, it is contemplated that all or a portion of controller 18 may reside in host 14. Nonetheless, as used herein, controller 18 is considered to be a part of imaging apparatus 12. Controller 18 communicates with print engine 20 and cartridge 22 via a communications link 38, and with user interface 26 via a communications link 42. Controller 18 serves to process print data and to operate print engine 20 during printing.

In the context of the examples for imaging apparatus 12 given above, print engine 20 may be, for example, an ink jet print engine or an electrophotographic print engine, configured for forming an image on a substrate 44, which may be one of many types of print media, such as a sheet of plain paper, fabric, photo paper, coated ink jet paper, greeting card stock, transparency stock for use with overhead projectors, iron-on transfer material for use in transferring an image to an article of clothing, and back-lit film for use in creating advertisement display and the like. As an ink jet print engine, print engine 20 operates cartridge 22 to eject ink droplets onto substrate 44 in order to reproduce text or images, etc. As an electrophotographic print engine, print engine 20 causes cartridge 22 to deposit toner onto substrate 44, which is then fused to substrate 44 by a fuser (not shown). In the embodiment depicted, imaging apparatus 12 is an ink jet unit.

Host 14 may be, for example, a personal computer, including memory 46, an input device 48, such as a keyboard, and a display monitor 50. One or more of a peripheral device 52, such as a digital camera, may be communicatively coupled to host 14 via communication links, such as communication link 54. Alternatively, it is contemplated that peripheral device 52 may be communicatively coupled to imaging apparatus 12. Host 14 further includes a processor system, including, for example, at least one microprocessor, and input/output (I/O) interface. Host 14 may also include a separate "video card" for performing image (graphics) processing, as is known in the art, which may operate in conjunction with the processor system of host 14. Memory 46 may be any or all of RAM, ROM, NVRAM, or any available type of computer memory, and may include one or more of a mass data storage device, such as a floppy drive, a hard drive, a CD drive, a DVD drive, and/or one or more removable memory card.

During operation, host 14 includes in its memory 46 program instruction that function as an imaging driver 58, e.g., printer/scanner driver software, for imaging apparatus 12. Imaging driver 58 is in communication with controller 18 of imaging apparatus 12 via communications link 16. Imaging driver 58 facilitates communication between imaging apparatus 12 and host 14, and provides formatted print data to imaging apparatus 12, and more particularly, to print engine 20. Although imaging driver 58 is disclosed as residing in memory 46 of host 14, it is contemplated that, alternatively, all or a portion of imaging driver 58 may be located in controller 18 of imaging apparatus 12.

During operation, host 14 also includes in its memory 46 a software program 60 including program instructions for analyzing an image. Although depicted as residing in memory 46 as a stand alone software program, it is contemplated that, alternatively, all or a portion of software program 60 may be formed as a part of imaging driver 58. As another alternative, it is contemplated that all or a portion of software program 60 may reside or operate in memory 36 of controller 18. In other alternatives, it is contemplated that software program 60 may reside in whole or in part in any or all of memory 46, memory 36, and peripheral device 52.

The present description of embodiments of the present invention applies equally to operations of software program 60 executing in controller 18 or as part of imaging driver 58, or as a software program separate from imaging driver 58 and controller 18. The instructions executed by the operation of software program 60 are generally described below, and any reference herein to such instructions applies equally to instructions being executed by controller 18, the processor and/or instructions executed as part of imaging driver 58, and/or a processor associated with peripheral device 52. As used herein, imaging driver 58 and software program 60 are considered to be a part of imaging apparatus 12. However, it is alternatively considered that software program 60 may be part of peripheral device 52, e.g. furnished with or loaded into peripheral device 52, or may be a separately procured software program.

In accordance with the present invention, an image, such as may be obtained via peripheral device 52, scanned by scanner 17, and/or otherwise obtained or created using host 14, is analyzed, using software program 60.

Figure 2:
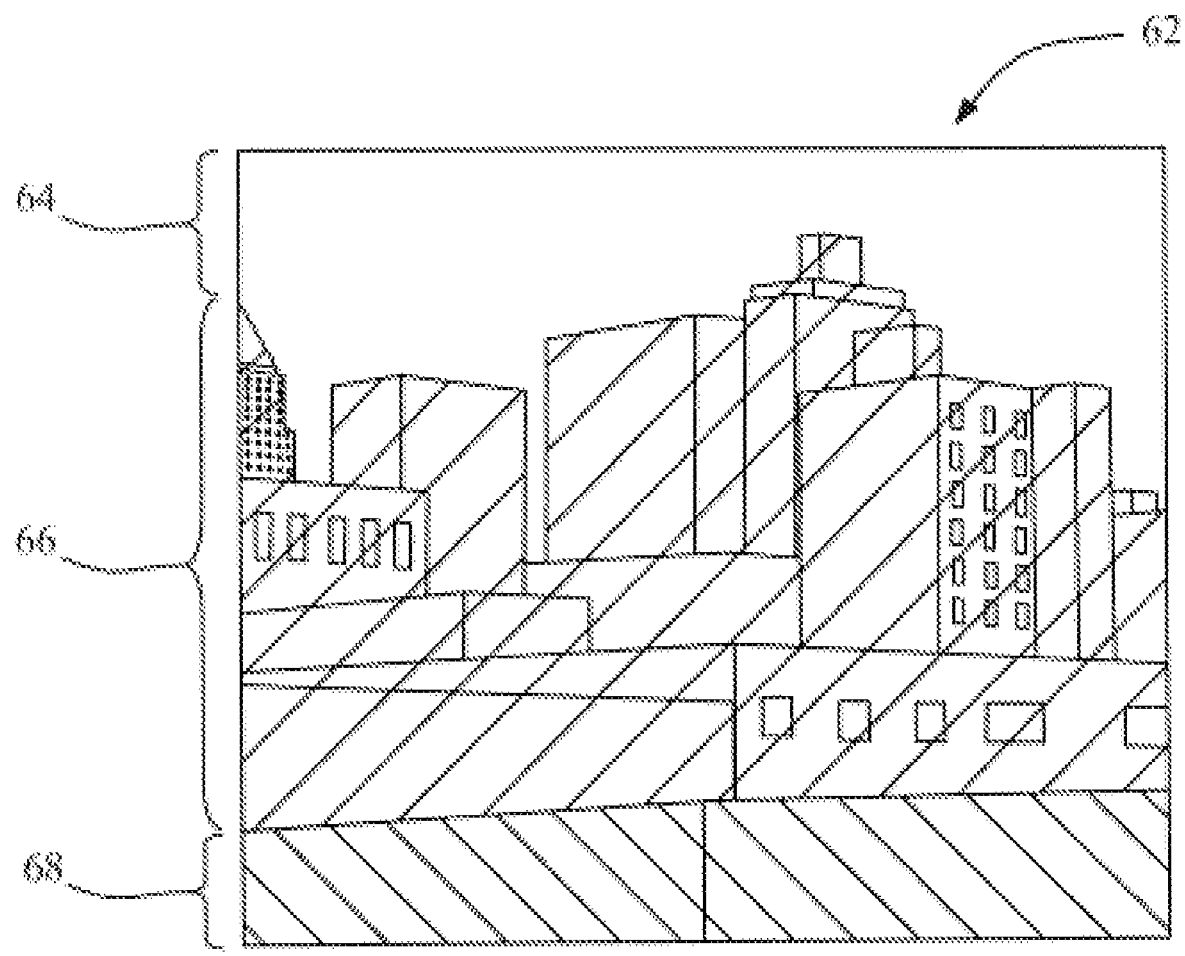
FIG. 2 depicts an image that may be analyzed in accordance with embodiments of the present invention.

Referring now to FIG. 2, an image 62 is depicted in the form of an exemplary image employed in describing embodiments of the present invention. As depicted, image 62 includes a portion representing the colors of the sky 64, various building 66, and a retaining wall 68, which are depicted as being different colors—sky 64 has no cross-hatching in FIG. 2, whereas building 66 are depicted with the cross-hatching the positive slope, and retaining wall 68 is depicted with the cross-hatching having the negative slope. It will be understood that, for purposes of explaining the present embodiment, image 62 represents a color photograph, with sky 64 being represented by a range of colors typical of the sky on a sunny day, buildings 66 being represented by a range of colors typical of large buildings in a city, and retaining wall 68 being represented by a range of darker colors, for example, as if it painted in generally dark colors and/or were in a shadow. Image 62 is formed of a plurality of pixels, wherein each pixel of the plurality of pixels includes a plurality of color channels, such as red, green, and blue (RGB). Although embodiments of the present invention are described with respect to RGB colors, it will be understood that the present invention is not limited to any particular colorspace, and may be used with other colorspaces, such as CMYK (cyan, magenta, yellow, and black). Each color channel of the plurality of color channels has a channel level within a range of channel levels corresponding to each pixel. For example, for 8-bit color, the channel level of a particular color channel may be any value between 0 and 255.

In order to analyze an image using a conventional histogram, the individual channels are graphed based on the number of pixels (the y-axis) at a particular channel level (the x-axis). However, the information that can be derived from a conventional histogram is limited. Digital libraries use automatic searching method based on histogram analysis for image retrieval. However, when searching for images, it is desirable to have more information than may be provided by conventional histograms, since, for example, different images can have similar or even identical histograms, and hence, automatic image searching methods based on histogram analysis would "see" the different images as being identical.

In order to show more image information, a multi-dimensional histogram may be created and employed in accordance with embodiments of the present invention. In such a multi-dimensional histogram, the image information is mapped along the y-axis as well as along the x-axis of the graph.

In the multi-dimensional histogram, the x-axis is still the channel level for the chosen color (as it is in a conventional histogram) but the y-axis extends above and below the x-axis, and represents the difference between the other two color channels. By using an ordered pixel rearrangement representative of the colors in the image, more information can be shown in the multi-dimensional histogram than in a conventional histogram. As with a conventional histogram, the x-axis represents a primary channel level. However, in a multi-dimensional histogram in accordance with the present invention, above the x-axis are arranged those pixels where the secondary channel level is greater than the tertiary channel level and under the axis are arranged those pixels where the tertiary channel level is greater than the secondary channel level.

Figure 3:
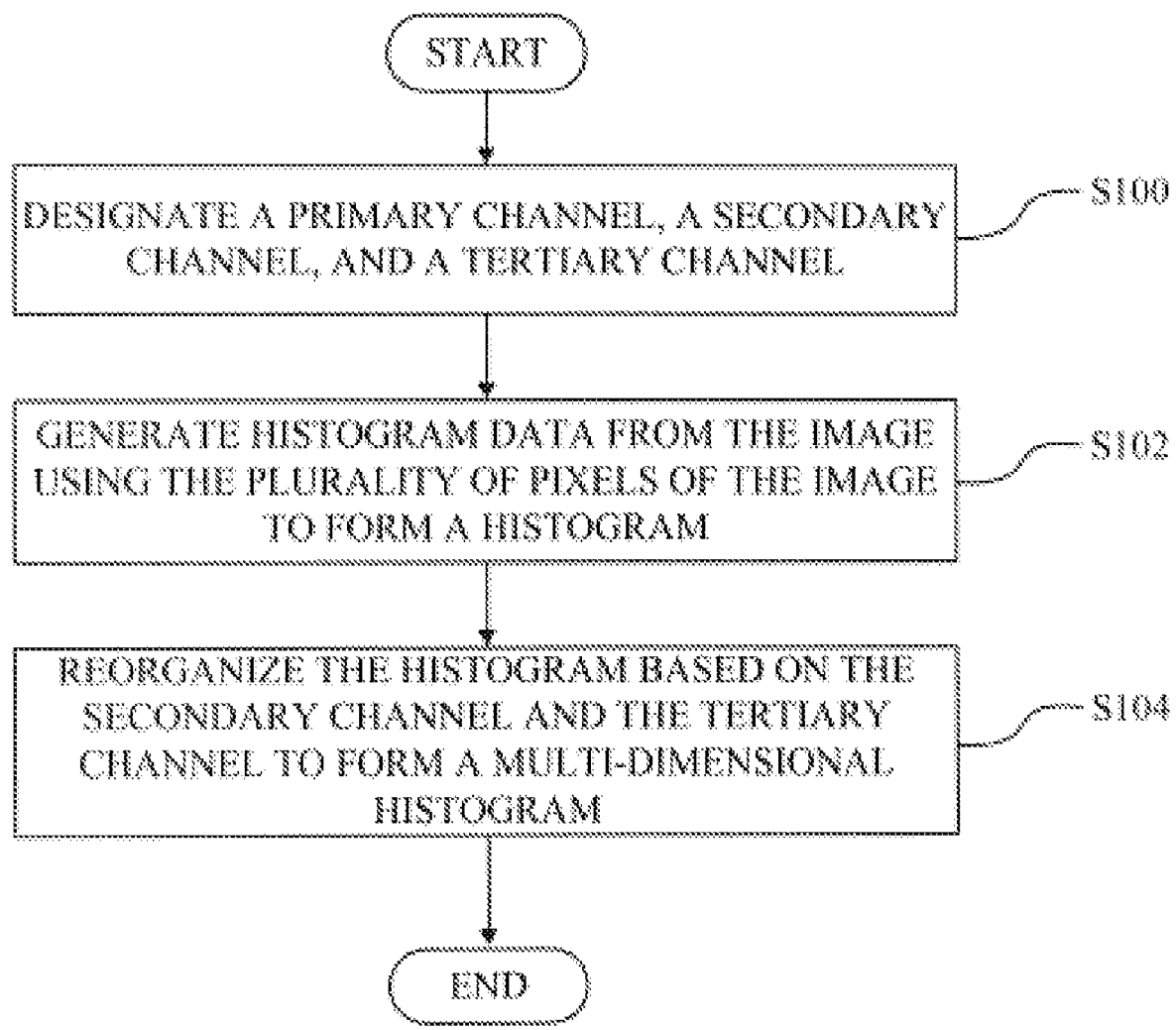
FIG. 3 is a flowchart depicting a method for analyzing an image in accordance with an embodiment of the present invention.

Referring now to FIG. 3, an embodiment of the present invention is described with respect to a flowchart having steps S100-S104, which depicts a method that may be employed in analyzing an image in accordance with an embodiment of the present invention. It shall be understood that the present embodiment and invention is not limited to the particular sequence described herein, but rather, that such sequence is employed as a convenience in describing the present embodiment, and that the ordering of each step in the sequence may be altered without departing from the scope of the present embodiment and invention.

At step S100, a primary channel, a secondary channel, and a tertiary channel are designated from the plurality of color channels.

At step S102, histogram data for image 62 is created using the plurality of pixels that form image 62.

Figure 4:
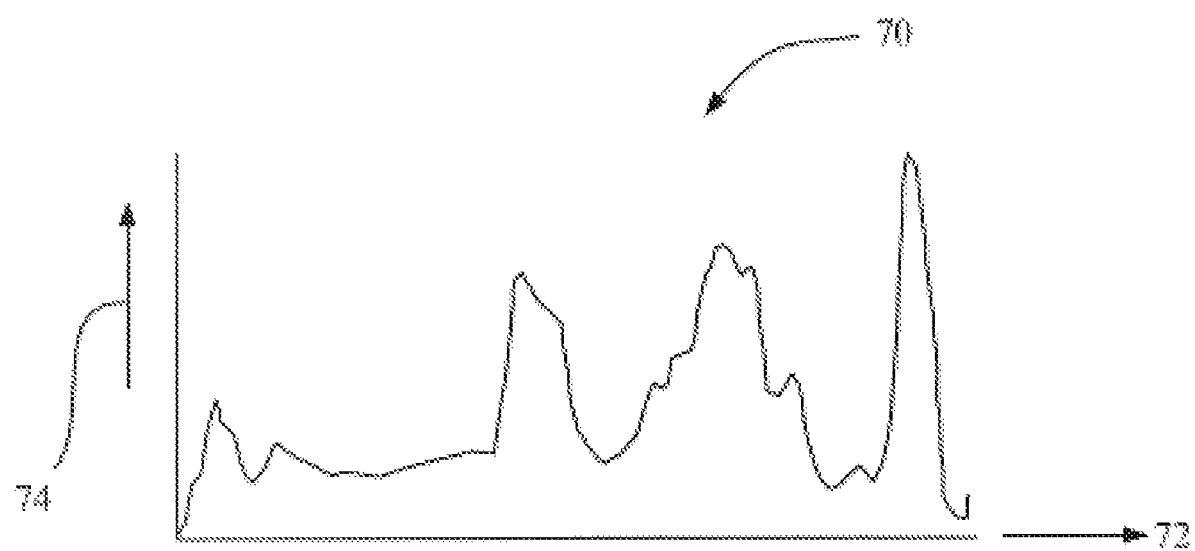
FIG. 4 is a representation of a histogram employed in describing a method for analyzing an image in accordance with embodiments of the present invention.

Referring now to FIG. 4, the histogram data is used to form a histogram 70 having a first axis 72 and a second axis 74 based on the primary channel. First axis 72 pertains to the range of channel level within the primary channel, e.g., 0-255 for 8-bit color, and second axis 74 pertains to the number to the number of pixels of image 62 at each channel level within the primary channel.

The histogram data arranged along first axis 72 in order using the primary channel level (ascending from 0 to 255). That is, the number of pixels at each primary channel level is arranged along first axis 72.

At step S104, the histogram is reorganized based on the channel and the tertiary channel to form a multi-dimensional histogram 76. The reorganizing of the histogram is based on determining a channel level difference as between the secondary channel and the tertiary channel for each pixel.

Figure 5:
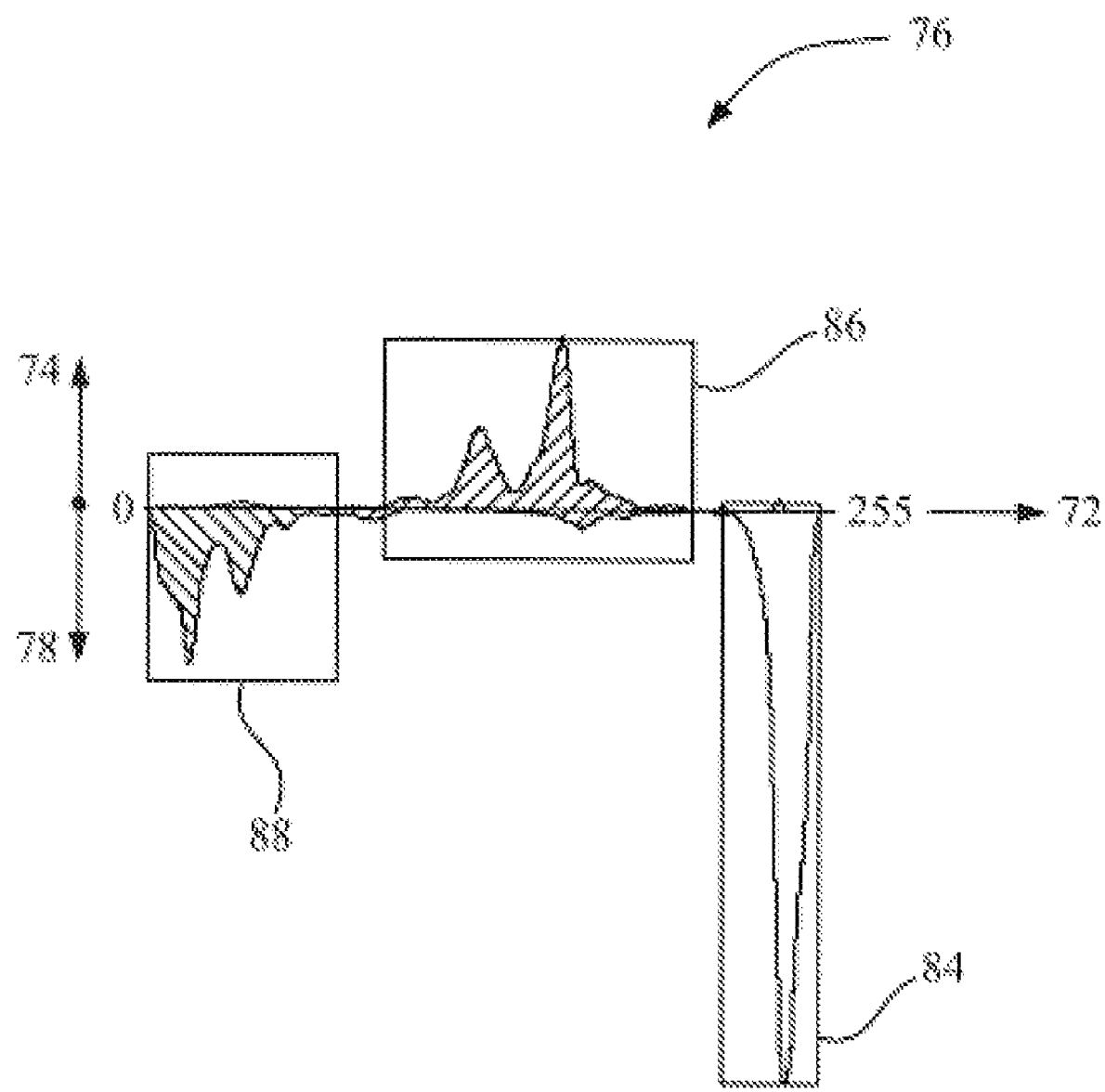
FIG. 5 depicts a multi-dimensional histogram created in accordance with embodiments of the present invention.

Referring now to FIG. 5, step S104 includes adding a third axis 78 to histogram 70, arranging the histogram data on second axis 74 for each pixel having one of a positive and a negative of the channel level difference, while retaining a position of each pixel on first axis 72; and arranging the histogram data on third axis 78 for each pixel having the other of the positive and the negative of the channel level difference.

In the present embodiment, if the difference between the secondary and tertiary channel levels as positive, the histogram data is arranged on second axis 74, whereas if the difference is negative, the histogram data is arranged on third axis 78. At any particular of channel level in the primary channel, the histogram data is uniformly disposed on second axis 74 and third axis 78 for each pixel having a zero channel level difference. Thus the histogram is symmetric about first axis 72 for those primary channel levels where the secondary channel level and tertiary channel level are the same value. If there is an odd number of pixels a primary channel level where the secondary channel level and tertiary channel level are the same value, the histogram data for the "extra" pixel may be placed on either the second axis or third axis; under such circumstance, the histogram data is still considered uniformly disposed on second axis 74 and third axis 78.

In order to provide additional information to multi-dimensional histogram 76, color information is provided in accordance with the present embodiment. That is, the color information associated with each pixel is included in the histogram data for the pixels, rendering multi-dimensional histogram 76 in the colors corresponding to image 62.

Due to the additional of third axis 78 in accordance with the present invention, multi-dimensional histogram 76 includes more information about image 62 than a conventional histogram, and may allow differentiation as between images that have the same or similar conventional histograms. Accordingly, automatic and manual searches of a digital image library may be performed with greater accuracy using multi-dimensional histogram 76 than similar searches that are based on conventional histograms.

In addition to aiding in searches of image libraries, the present invention may also be employed to determine whether an image has been modified, for example, yielding a posterization effect.

Accordingly, step S104 may include determining the presence of artifacts in multi-dimensional histogram 76. For example, if portion of an image have been electrically changed, for example, if the colors were modified using conventional graphic software, such as modifying the colors of the sky 64, building 66, and/or retaining wall 68, the color information provided to the pixels by such software is typically provided at nonconsecutive discrete color channel levels in one or more of the primary, secondary, and tertiary channels, which causes a posterization effect wherein the color do not transition smoothly from one to another.

Figure 6:
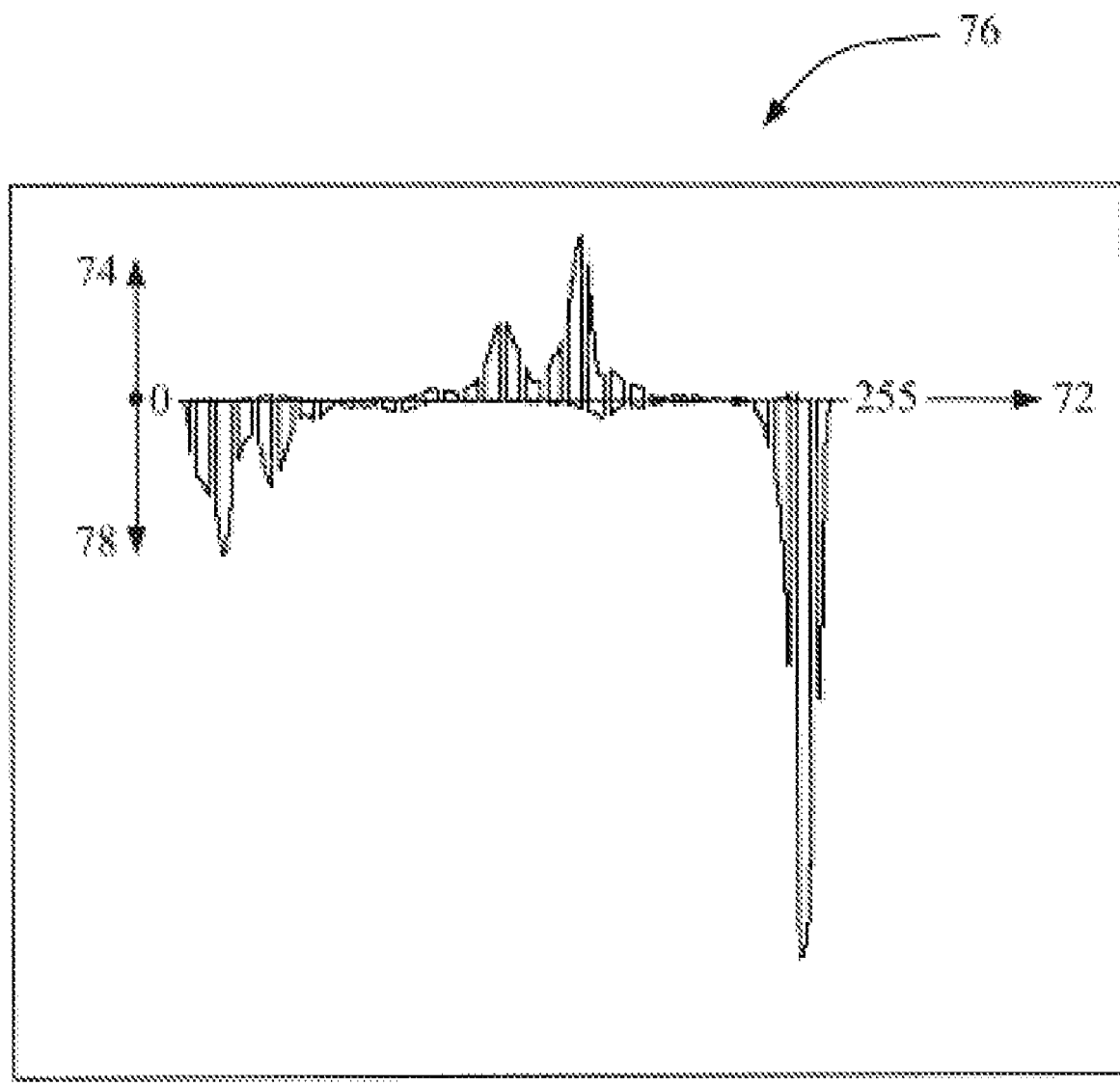
FIG. 6 depicts a multi-dimensional histogram of an image having posterization artifacts, the present of which may be determined by using an embodiment of the present invention.

For example, referring now to FIG. 6, am example of a multi-dimensional histogram 76 for an image having a posterization artifact is depicted. It is seen from FIG. 5, that the color information is not uniform, but has "breaks" in it, which is be indicative of a posterization artifact that may render the final printed image undesirable. Depending on the image and modifications thereto, the "breaks" that are present in multi-dimensional histogram 76 would not exist in a conventional histogram, owing to the fact that multi-dimensional histogram 76 includes more image information than a conventional histogram.

Accordingly, by analyzing multi-dimensional histogram 76, either visually or automatically, it may be determined that image 62 had been modified from an original image based on the presence of the artifacts.

Figure 7:
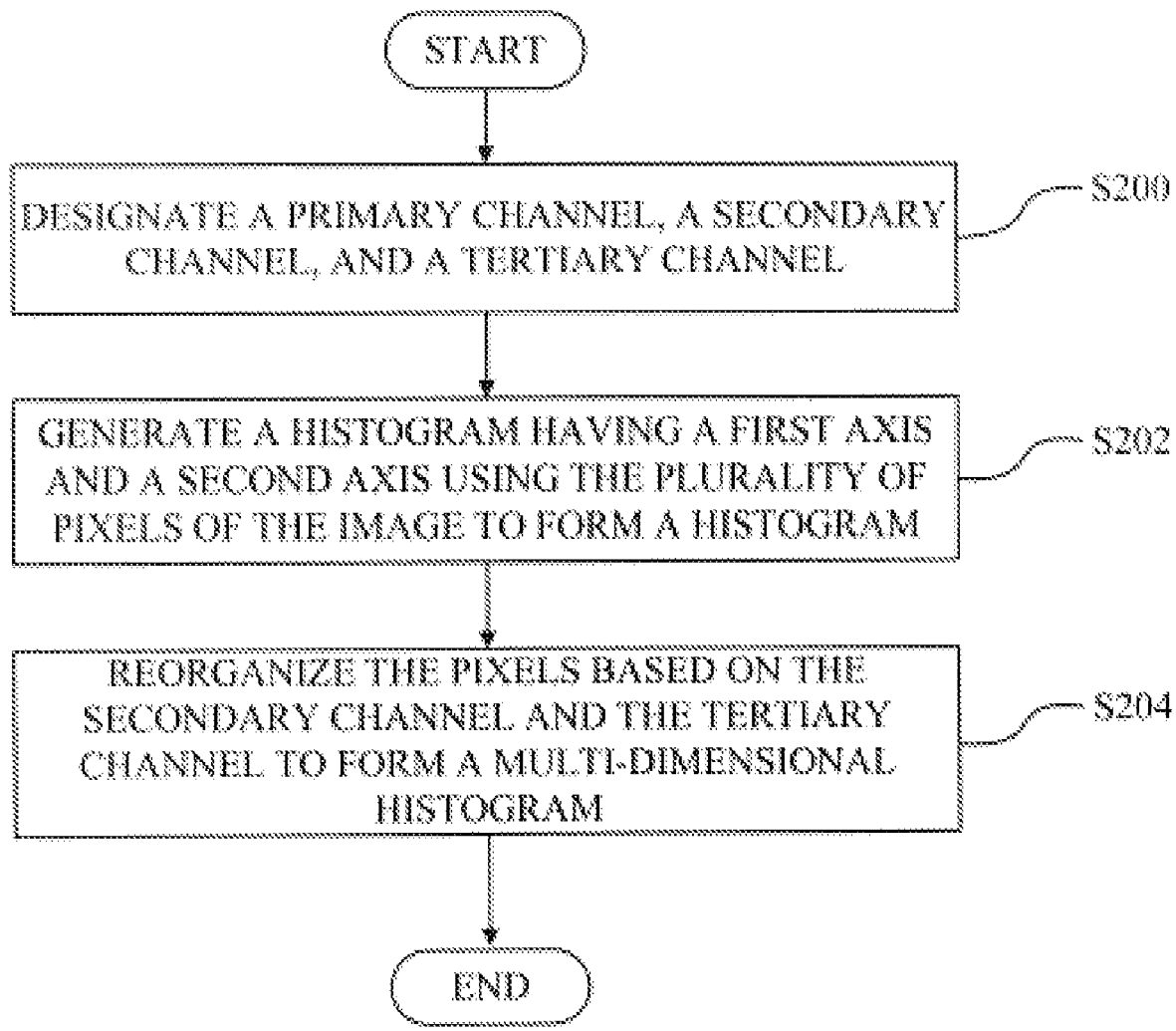
FIG. 7 is a flowchart depicting another method for analyzing image in accordance with another embodiment of the present invention.

Referring now to FIG. 7, another embodiment of a method for analyzing an image in accordance with the present invention is depicted.

At step S200 a primary channel, a secondary channel, and a tertiary channel are designed from the plurality of color channels.

At step S202, a histogram 70 having first axis 72 and second 74 is generated using plurality of pixels by arranging each pixel along first axis 72 and second axis 74 based on the primary channel. The first axis pertains to the range of channel levels within the primary channel, and the second axis pertains to the number of pixels of image 62 at each channel level within the primary channel, each pixel in histogram 70 having a position along the first axis. The pixels and placed in order along first axis 72 using the primary channel level (ascending from 0 to 255). Those pixels that have the same primary channel level are "stacked" on one another.

At step S204, the pixels are reorganized based on the secondary channel and the tertiary channel to form multi-dimensional histogram 76. The reorganizing of histogram 70 is based on determining a channel level difference as between the secondary channel and the tertiary channel for each pixel.

Referring again to FIG. 5, step S204 includes adding third axis 78 to the histogram 70, arranging each pixel on second axis 74 that has one of a positive and a negative of the channel level difference, while retaining the position along first axis 72; and arranging each pixel on third axis 78 that has the other of a positive and negative of the channel level difference, while retaining the position along first axis 72. Thus, the difference between the secondary and tertiary channel levels is used to position the pixels along second axis 74 and third axis 78 after the pixels had already been positioned along first axis 72.

For both second axis 74 and third axis 78, there are two ordering of the pixels: an ordering based on the secondary channel level for second axis 74 and on the tertiary channel level for third axis 78, and an ordering based on the difference between the secondary and tertiary channel levels. Hence, the pixels are arranged such that those pixels with the lowest secondary channel level are placed closest to first axis 72 and those with the highest secondary channel level are place the farthest from first axis 72, for second axis 74, such that those pixels with the lowest tertiary channel level are placed closest to first 72 and those with the highest tertiary channel level are place the farther from first axis 72, for third axis 78, and also arranged according to the magnitude of the channel level difference, such that those pixels having the lowest channel level difference are located closer to first axis 72, whereas those pixels having the greatest channel level difference are located the farther from first axis 72.

In the present embodiment, if the difference between the secondary and tertiary channel levels is positive for a pixel, that pixel is arranged on second axis 74, whereas if the difference is negative, that pixel is arranged on third axis 78.

If the secondary and tertiary channels are equal the half of the pixels are arranged above the axis and half of the pixels are placed below the axis. For example, at any particular of channel level in the primary channel, the histogram is uniformly disposed on second axis 74 and third axis 78 for each pixel having a zero channel level difference. Thus the histogram is symmetric about first axis 72 for those primary channel levels where the secondary channel level and tertiary channel level are the same value. If there is an odd number of pixels a primary channel level where the secondary channel level and tertiary channel level are the same value, the "extra" pixel may be placed on either the second axis or third axis: under such circumstance, the histogram data is still considered uniformly disposed on second axis 74 and third axis 78.

Figure 8A:
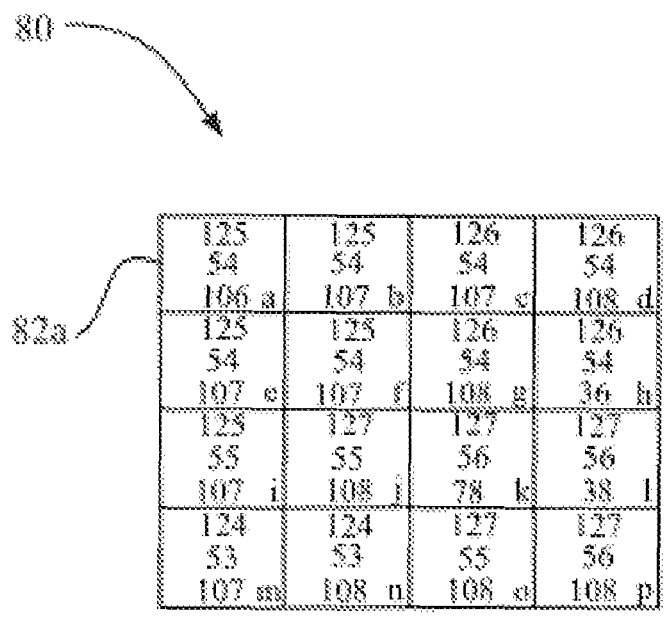
FIGS. 8A and 8B depict an example used in describing an embodiment of the present invention.
Figure 8B:
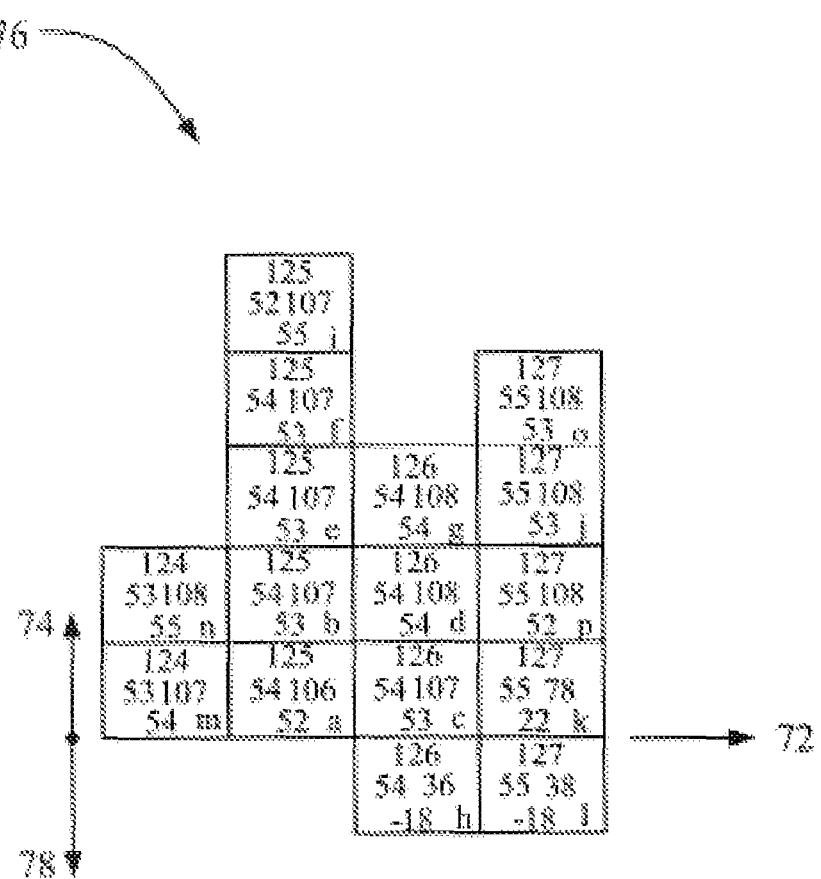

Referring now to FIGS. 8A and 8B, an example of the present embodiment is explained. In FIG. 7A, a 4×4 matrix 80 of pixels, each represented as a box, is depicted, which illustrates the channel level of blue, green and red corresponding to each pixel. For example, pixel 82a has a blue channel level of 125 (the top number), a green channel level of 54 (the middle number), and a red channel level of 106 (bottom number). The alphabetical letters in the lower right corners of the boxes designate the individual pixels. In the example of FIGS. 8A and 8B, the blue channel is designated as the primary channel, the red channel is designated as the secondary channel, and the green channel is designer as the tertiary channel.

In FIG. 8B, the pixels have been arranged along first axis 72 and second axis 74 based on the primary channel, which in the present example is blue. The lowest primary color levels are on the left and the highest primary color levels are on the right. This makes 4 columns of pixels in the present example.

The number in each box (representing a pixel) have been modified in FIG. 8B to include the difference between the secondary and tertiary channel for each pixel. The top number remains the primary channel level, whereas the middle group of numbers represents the secondary and tertiary channel levels, respectively, and the bottom number in each box represents the difference between the secondary (red) and the tertiary (green) channel levels.

After arranging the pixels along first axis 72 based on the primary channel level, each of the pixel columns are arranged in order from the lowest to the highest secondary channel level (on second axis 74) and from the lowest to highest tertiary channel level (on third axis 78), proceeding outwardly from first axis 72, and then arranged based on the lowest difference (between the secondary and tertiary channel levels) to the highest difference (between the secondary and tertiary channel levels), proceeding outwardly from first axis 72.

The area under first axis 72, i.e., along third axis 78, is representative of those pixels where the tertiary color channel level exceeds the secondary channel level, so the roles of the secondary and tertiary channel levels are reversed, as compared to the area above first axis 72, i.e., second axis 74.

Hence, multi-dimensional histogram 76 is arranged as follows: The pixels of image 62 are distributed alone first axis 72 based on the primary channel level of each pixel, forming columns of pixels that extend along second axis 74 and third axis 78. The columns extending in the direction of second axis 74 begin with the pixels having the lowest secondary channel level being arranged just above first axis 72, and the pixels with the increasing secondary channel levels being placed above the pixels having lower secondary channel levels. The columns extending in the direction of third axis 78 begin with the pixels having the lowest tertiary channel level being arranged just under first axis 72, and the pixels with the increasing tertiary channel levels being placed underneath the pixels having lower tertiary channel levels. The pixels having the same secondary channel levels are arranged in order along second axis 74, proceeding from the lowest channel level difference (between the secondary and tertiary channel levels) to the greatest difference (between the secondary and tertiary channel levels). The pixels having the same tertiary channel levels are arranged in order along third axis 78, proceeding from the lowest difference (between the secondary and tertiary channel levels) to the greatest difference (between the secondary and tertiary channel levels).

In the completed multi-dimensional histogram of the present example, blue is the primary channel (with a 0 level on the left and a 255 level on the right) and the secondary and tertiary channels are red and green respectively. In conventional histograms, this information exists but only in a single dimension, e.g., line on the histogram. By examining the multi-dimensional color histogram, various parts of the image can be seen that cannot be seen in a conventional histogram.

For example, referring again to FIG. 5, it is seen that the sky 64 area of the image becomes a spike 84 on the right side of multi-dimensional histogram 76, while the buildings 66 become a strata 86 of color in the central portion of multi-dimensional histogram 76, and retaining wall 68 becomes a strata 88 of color on the left portion of multi-dimensional histogram 76. This color information may be used by an image search engine to find images having certain color characteristics, or to exclude images having certain color characteristics.

The same areas of multi-dimensional histogram 76 are apparent when green or red are selected as the primary channel.

Multi-dimensional histograms can also determine between images with similar normal histograms. When the pixel reorganization procedure of step S204 is applied to these images, different multi-dimensional histograms are created for images that had the same conventional histogram.

Multi-dimensional histograms can be used to evaluate the effect of imaging algorithms on particular parts of an image. For example, referring to FIG. 6, posterization occurs in areas of the image that were re-colored using graphics software, which may be detected using the inventive multi-dimensional histogram, for example, as set forth above with respect to the previous embodiment.

Hence, as with the previous embodiment, step S204 may include determining the presence of artifacts in multi-dimensional histogram 76, and accordingly, by analyzing multi-dimensional histogram 76, either visually or automatically, it may be determined that image 62 has been modified from an original image based, on the presence of the artifacts.

While this invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for analyzing an image, said image being formed of a plurality of pixels, wherein each pixel of said plurality of pixels includes a plurality of color channels, each color channel of said plurality of color channels having a channel level within a range of channel levels corresponding to said each pixel, comprising:
   designating from said plurality of color channels a primary channel, a secondary channel, and a tertiary channel;
   generating histogram data form said image using said plurality of pixels to form a histogram having a first axis and a second axis based on said primary channel, said first axis pertaining to said range of channel levels within said primary channel, and said second axis pertaining to a number of pixels of said image at each said level within said primary channel; and
   reorganizing said histogram based on said secondary channel and said tertiary channel to form a multi-dimensional histogram, wherein said reorganizing said histogram is based on determining a channel level difference as between said secondary channel and said tertiary channel for said each pixel,
wherein at least one of the designating, the generating and the reorganizing is performed by a computer executable process stored on a computer readable storage medium.

2. The method of claim 1, wherein said reorganizing said histogram includes:
   adding a third axis to said histogram;
   arranging said histogram data on said second axis for said each pixel having one of a positive and a negative of said channel level difference, while retaining a position of said each pixel on said first axis; and
   arranging said histogram data on said third axis for said each pixel having the other of said positive and said negative of said channel level difference.

3. The method of claim 1, wherein at any particular of said channel level in said primary channel said histogram data is uniformly disposed on said second axis and said third axis for each pixel having a zero channel level difference.

4. The method of claim 1, wherein said histogram data includes color information for said each pixel.

5. The method of claim 1, further comprising determining the presence of artifacts in said multi-dimensional histogram.

6. The method of claim 5, further comprising determining that said image had been modified from an original image based on said presence of said artifacts.

7. A method for analyzing an image, said image being formed of a plurality of pixels, wherein each pixel of said plurality of pixels includes a plurality of color channels, each color channel of said plurality of color channels having a channel level within a range of channel levels corresponding to said each pixel, comprising:
   designating from said plurality of color channels a primary channel, a secondary channel, and a tertiary channel;
   generating a histogram having a first axis and a second axis using plurality of pixels by arranging said each pixel along said first axis and said second axis based on said primary channel, said first axis pertaining to said range of channel levels within said primary channel, and said second axis pertaining to a number of pixels of said image at each said channel level within said primary channel, said each pixel in said histogram having a position along said first axis; and
   reorganizing said pixels based on said secondary channel and said tertiary channel to form a multi-dimensional histogram, wherein said reorganizing said histogram is based on determining a channel level difference as between said secondary channel and said tertiary channel for said each pixel,
wherein at least one of the designating, the generating and the reorganizing is performed by a computer executable process stored on a computer readable storage medium.

8. The method of claim 7, wherein said reorganizing said histogram includes:
   adding a third axis to said histogram;
   arranging said each pixel on said second axis for said each pixel having one of a positive and a negative of said channel level difference, while retaining said position along said first axis of said each pixel; and
   arranging said each pixel on said third axis for said each pixel having the other of said positive and said negative of said channel level difference, while retaining said position along said first axis of said each pixel.

9. The method of claim 8, wherein at any particular of said channel level in said primary channel said histogram is uniformly disposed an said second axis and said third axis for said each pixel having a zero channel level difference.

10. The method of claim 7, further comprising determining the presence of artifacts in said multi-dimensional histogram.

11. The method of claim 7, further comprising determining that said image had been modified from an original image based on said presence of said artifacts.

12. A computer readable medium storing computer executable instructions for analyzing an image, said image being formed of a plurality of pixels, wherein each pixel of said plurality of pixels includes a plurality of color channels, each color channel of said plurality of color channel having a channel level within a range of channel levels corresponding to said each pixel, comprising:
   designating from said plurality of color channels a primary channel, a secondary channel, and a tertiary channel;
   generating histogram data from said image using plurality of pixels to form a histogram having a first axis and a second axis based on said primary channel, said first axis pertaining to said range of channel levels within said primary channel, and said second axis pertaining to a number of pixels of said image at each said channel level within said primary channel; and
   reorganizing said histogram on said secondary channel and said tertiary channel to form a multi-dimensional histogram, wherein said reorganizing said histogram is based on determining a channel level difference as between said secondary channel and said tertiary channel for said each pixel.

13. The computer readable storage medium of claim 12, wherein said reorganizing said histogram includes:
   adding a third axis to said histogram;
   arranging said histogram data on said second axis for said each pixel having one of a positive and a negative of said channel level difference, while retaining a position of said each pixel on said first axis; and
   arranging said histogram data on said third axis for each pixel having the other of said positive and said negative of said channel level difference.

14. The computer readable medium of claim 13, wherein at any particular of said channel level in said primary channel said histogram data is uniformly disposed on said second axis and said third for said each pixel having a zero channel level difference.

15. The computer readable medium of claim 12, wherein said histogram data includes color information for said each pixel.

16. The computer readable medium of claim 12, further comprising determining the presence of artifacts in said multi-dimensional histogram.

17. The computer readable medium of claim 12, further comprising determining that said image modified from an original image based on said presence of said artifacts.

* * * * *